United States Patent [19]

Byun et al.

[11] Patent Number: 5,684,754

[45] Date of Patent: Nov. 4, 1997

[54] METHOD AND SYSTEM FOR CORRECTING SEISMIC TRACES FOR NORMAL MOVE-OUT STRETCH EFFECTS

[75] Inventors: Bok S. Byun, Plano; E. Stuart Nelan, Dallas, both of Tex.

[73] Assignee: Atlantic Richfield Company, Los Angeles, Calif.

[21] Appl. No.: 571,459

[22] Filed: Dec. 13, 1995

[51] Int. Cl.$^6$ .................. G01V 1/36; G01V 1/28
[52] U.S. Cl. .................. 367/52; 367/21; 367/45; 364/421
[58] Field of Search .................. 367/21, 43, 45, 367/52; 364/421

[56] References Cited

U.S. PATENT DOCUMENTS

| | | | |
|---|---|---|---|
| 4,995,007 | 2/1991 | Corcoran et al. | 364/421 |
| 5,083,297 | 1/1992 | Ostrander | 367/36 |
| 5,119,315 | 6/1992 | Kemp et al. | 364/498 |
| 5,297,108 | 3/1994 | Swan | 367/38 |
| 5,515,335 | 5/1996 | Swan | 367/47 |
| 5,583,825 | 12/1996 | Carrazzone et al. | 367/31 |

OTHER PUBLICATIONS

Ursin et al, 62nd Annu SRG Int. Mtg., Oct., 29, 1992, Geophysics, vol. 60, #2, pp. 317-326; Abst. Herewith.
Li, Q., Oil Geophysics Processing, vol. 30, #2, pp. 147-167, Apr. 15, 1995; Abst. Anly. herewith.
Hu, Z., Geophys. Prospecting Petro., vol. 29, #3, pp. 107-112, Sept. 1990: Abst. Anly. Herewith.
Qu et al, J. Univ. Petrol., China, vol. 19, #5, pp. 18-24, Oct. 1995. Abst. Herewith.

Primary Examiner—Nelson Moskowitz
Attorney, Agent, or Firm—Anderson, Levine & Lintel

[57] ABSTRACT

A computer-implemented method and system of correcting seismic survey data for the effects of NMO stretch is disclosed. The method operates upon a CDP gather of seismic survey data after normal move-out correction (NMO) has been applied. A semblance analysis is used to derive a stretch coefficient $\kappa$ profile over the gather, as a function of time and offset. The values of the stretch coefficient profile $\kappa$ are used in producing a time-varying filter that is applied, preferably by way of a time-domain multiplication, to incremental windows in time for each trace, with the products added to one another to generate a corrected trace. After all of the traces in the gather are corrected, an event-weighted filter is applied to the traces by way of a correlation operation, to remove high-frequency artifacts in the corrected traces. The corrected and filtered traces are then ready for stacking and conventional processing.

21 Claims, 8 Drawing Sheets

METHOD AND SYSTEM FOR CORRECTING SEISMIC TRACES FOR NORMAL MOVE-OUT STRETCH EFFECTS

This invention is in the field of seismic prospecting for oil and gas reservoirs, and is more specifically directed to techniques for analyzing seismic survey results.

BACKGROUND OF THE INVENTION

The use of seismic surveys is fundamental in the field of prospecting for subsurface geological structures bearing oil and gas in producible quantities. Both land-based and marine seismic surveys are conventionally done by imparting acoustic energy into the earth at one or more source locations; acoustic detectors are arranged at various locations away from the source, to detect and record, over time, the amplitude of energy reflected from subsurface geological formation interfaces. The time at which reflected energy arrives at the detectors (relative to the time at which the energy was imparted into the earth) corresponds to the distance through the earth traveled by the energy divided by the acoustic velocity of the subsurface structures. Accordingly, reflections from deeper interfaces are detected after longer delay times than are reflections from shallower interfaces. Analysis of the time-domain results can thus be used to determine the depth and location of reflective interfaces between geological strata.

Figure 1:
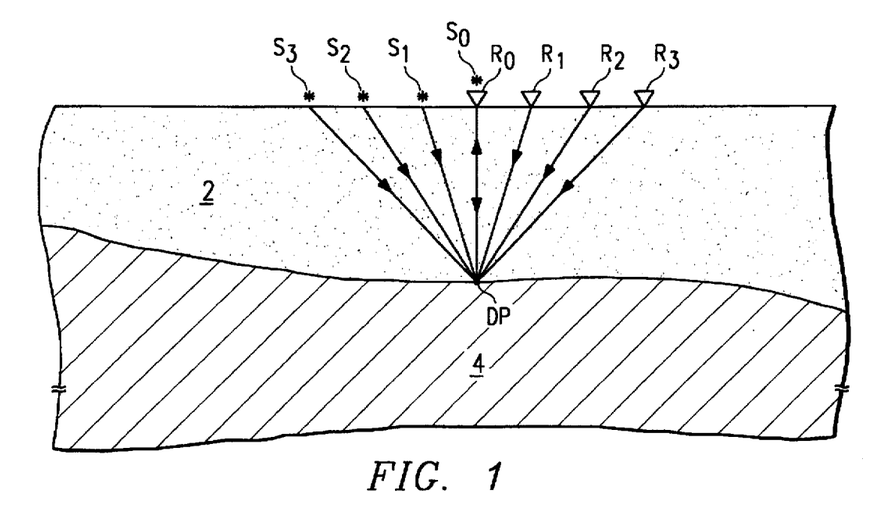
FIG. 1 is a schematic cross-sectional diagram of a portion of the earth at which a conventional seismic survey is being taken.

Of course, random noise in the detected energy will reduce the ability of the geologist to discern reflecting interfaces, particularly those interfaces which are at great depths, for which the reflected energy is greatly attenuated by the long travel distances through the earth. A conventional approach to reducing the effects of random noise is referred to in the art as a common depth point (CDP) gather and stack. Referring now to FIG. 1, this well-known conventional approach will now be described relative to a schematic cross-sectional view of the earth at which an exemplary survey is being taken.

Figure 2:
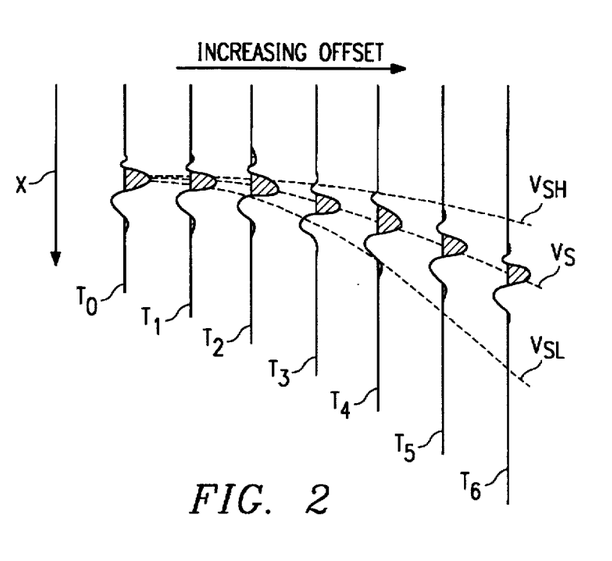
FIG. 2 is a portion of a set of seismic traces in a common depth point (CDP) gather, illustrating the effects of offset on the time delay of the signal.

As shown in FIG. 1, a reflective geological interface is present in the earth between subsurface strata 2, 4, along which a particular depth point DP of interest for this description is present; of course, many depth points will be analyzed along this and other interfaces in a typical survey. As is evident from FIG. 1, many source/receiver pairs will impart energy to and receive reflected energy from depth point DP, at varying angles. The so-called "zero-offset" source receiver pair $S_0$, $R_0$ corresponds to the case where both the source and detector are directly above depth point DP (i.e., there is no offset distance between receiver $R_0$ and the surface location directly over depth point DP). The other source/receiver pairs $S_1$, $R_1$; $S_2$, $R_2$; $S_3$, $R_3$ similarly impart energy to and receive reflected energy from depth point DP, but at varying angles and thus at varying offsets. The distance along which energy must travel from source $S_3$ to receiver $R_3$ is, of course, much greater than the distance along which energy must travel in the zero-offset pair $S_0$, $R_0$, due to the large angle from the vertical of the path of energy from source $S_3$ to receiver $R_3$. Accordingly, in the time-domain seismic records of the energy received at receivers $R_0$ and $R_3$, the time at which the trace for receiver $R_3$ indicates energy reflected from depth point DP is later than the time at which energy reflected from depth point DP is indicated in the trace for receiver $R_0$. This difference in the time of the reflections is illustrated in FIG. 2 relative to an exemplary simplified set of seismic traces $T_0$ through $T_6$, in which each trace T corresponds to energy reflected from the same depth point DP at increasing offsets (from trace $T_0$ to trace $T_6$); as is well known in the art, the collection and display of seismic records corresponding to a common depth point is referred to as a common depth point (CDP) gather.

The conventional "stack" process is used in the art to improve the signal-to-noise ratio in seismic surveys. This improvement is based upon the effect that common depth point reflections received at different offsets will tend to reinforce one another when summed, while random noise will tend to cancel out when summed. However, in order to stack the traces of FIG. 2, each of the traces must be corrected to account for the additional distance that the acoustic energy must travel for increasing offset. Such correction will allow the true reflection pulses in the traces to line up with one another in time, enabling the stack to merely sum the traces in the time-domain to provide the improved stack trace.

The correction of seismic data to account for varying offset among common depth point seismic traces is commonly referred to in the art as normal move-out correction (NMO). Conventional NMO processing assumes a constant acoustic velocity (often referred to as the NMO velocity $V_{NMO}$, or the stacking velocity $V_s$) for the stratum within which the correction is to be made. Selection of the proper stacking velocity is, of course, important in accurately performing the NMO correction. In the example of FIG. 2, stacking velocity $V_s$ is the proper stacking velocity; velocity $V_{SL}$ is too low and velocity $V_{SH}$ is too high, as indicated by the hyperbolae corresponding to these velocities. In the NMO operation, the travel time t at a trace of offset x (i.e., the distance between the receiver and the surface location directly over the depth point) is related to a travel time $t_0$ in its common depth point zero-offset trace according to the well-known Dix hyperbola, using the stacking velocity $V_s$ as follows:

$$t^2 = t_0^2 + \frac{x^2}{V_s^2(t_0)}$$

Accordingly, one may perform a transform upon each trace in the CDP gather by applying the Dix hyperbola to each time point t in the trace, and solving for the corresponding zero-offset time $t_0$. This transformation will place each trace into a zero-offset-time domain, in which case the reflections from the common depth point should all line up, assuming that the correct stacking velocity $V_s$ is selected.

Figure 3A:
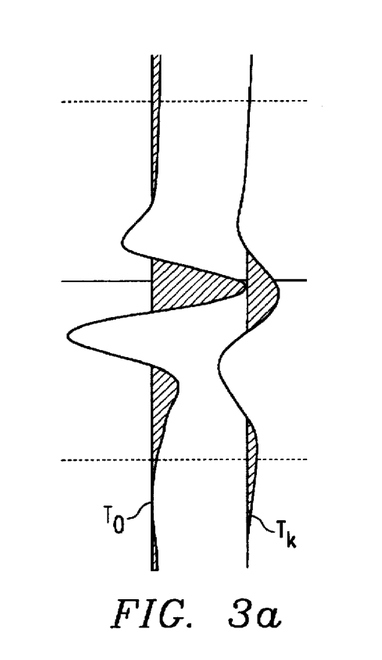
FIGS. 3a and 3b are selected seismic traces illustrating the effects of normal move-out (NMO) stretch.
Figure 3B:
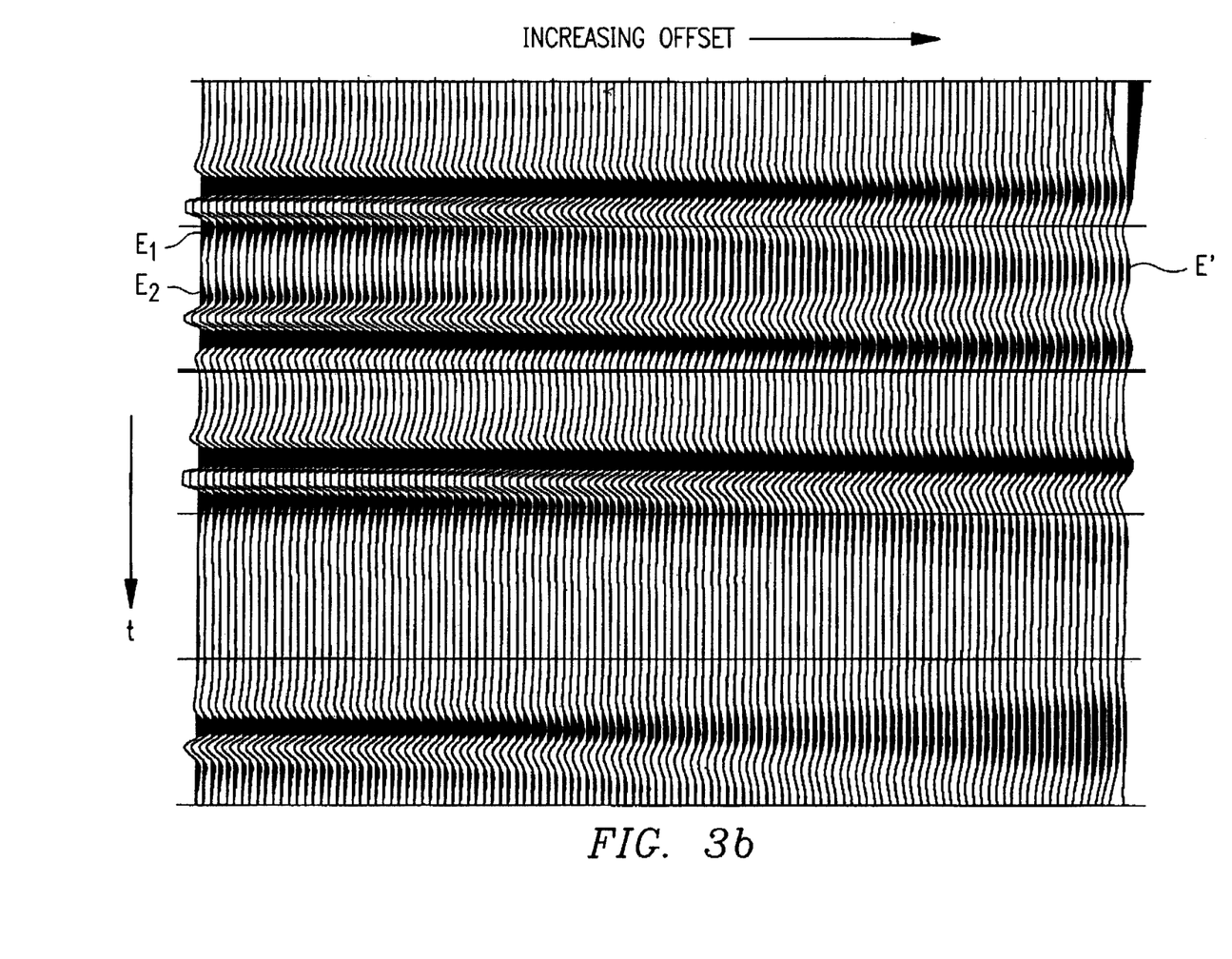

However, as is well known in the art, the transformation of non-zero offset traces according to conventional NMO through the Dix hyperbola distorts the amplitude and shape of the seismic waveforms, generally at shallower depths and increasing offsets. This distortion is referred to as NMO stretch, as the distortion effects tend to flatten out the peaks of the trace waveforms, extending the time length of each pulse over a wider range. FIG. 3a illustrates the effects of NMO stretch in detail, by way of a comparison of a wavelet $E_0$ on small-offset trace $T_0$ versus wavelet $E_K$ on large-offset trace $T_K$, each representative of the same reflection event, after conventional NMO correction has been applied. As shown in FIG. 3a, the wavelet for a given reflection on a larger offset trace has longer time-duration, after NMO correction, than a wavelet due to the same reflection on a smaller offset trace. Any amplitude attenuation that may have reduced the amplitude of larger-offset wavelet $E_K$ relative to near-offset wavelet $E_0$ is not due to the effects of NMO correction, but rather is the effect of increased attenuation from the longer subsurface path traveled by the reflected energy for the larger offset trace. FIG. 3b illustrates an example of a typical CDP gather, in which the effects of NMO stretch are evident over a large series of traces of increasing offset. As shown in FIG. 3b, the distortion effects become more pronounced at arrival times where the correction made in NMO is greater. In fact, closely spaced wavelets (e.g., $E_1$ and $E_2$) at small offset may distort to such an extent as to appear as a single wavelet at large offset (E'). This is because sets of wavelets on a trace do not exactly follow parallel Dix hyperbolae; instead, the hyperbolae tend to flatten with increasing time (i.e., greater depth). Because of the effects of NMO stretch, the signal-to-noise ratio in stacked traces after conventional NMO correction is somewhat limited.

It is therefore an object of the present invention to provide a method and system for correcting NMO stretch in seismic survey data.

It is a further object of the present invention to provide such a method and system that utilizes deterministic measurements of velocity, phase dispersion and amplitude stretch, thus minimizing reliance upon extrinsic data for correction.

It is a further object of the present invention to provide such a method and system in which improved NMO correction is obtained without amplification of noise.

Other objects and advantages of the present invention will be apparent to those of ordinary skill in the art having reference to the following specification together with its drawings.

SUMMARY OF THE INVENTION

The invention may be incorporated into a computer system and method of analyzing time-domain seismic survey data. The computer is programmed to retrieve the traces in a common depth point (CDP) gather; conventional normal move-out correction, for example by application of the Dix hyperbolic equation, is then performed. Beginning with a selected trace, semblance analysis is performed to determine a stretch coefficient profile over the gather, varying over time and offset distance. A time-variant stretch factor filter, based upon a stretch factor $\lambda$ for the particular window in the trace, is then applied to the selected trace in a time-varying manner, preferably by way of time-domain convolution. The application of the stretch factor filter is then repeated for all of the traces in the gather. Following the stretch factor correction for the gather, a low-pass filter is applied to the traces to filter out any high frequency effects that may have been added in the stretch filter application; the preferred filter is an event-weighted filter based upon the correlation of a target signal to each of the stretch-corrected traces. Upon completion of the filter operation, stacking of the gather can be performed, with improved signal-to-noise margin resulting from the stretch factor filtering according to the present invention.

DETAILED DESCRIPTION OF THE PREFERRED EMBODIMENT

As will become apparent from the following description of the preferred embodiment of the invention, the present invention corrects frequency-dependent amplitude and phase distortion of seismic survey trace signals. A particular source of such distortion is that which arises from conventional normal move-out (NMO) correction, where time-domain seismic traces are adjusted to account for source/ receiver offset in the survey; these distortion effects are referred to as "NMO stretch", as described hereinabove. The present invention presents a practical technique for correcting such distortion in pre-stack seismic data, particularly in those situations where the subsurface is approximately horizontally layered so that conventional CDP gathering provides an adequate estimate of stacking velocity. The method according to the preferred embodiment of the invention is also particularly useful in those cases in which the distorted wavelets have gradual high-frequency rolloff, rather than a sharp cutoff, as high frequency signal components may be recovered despite being embedded within noise components.

Figure 4A:
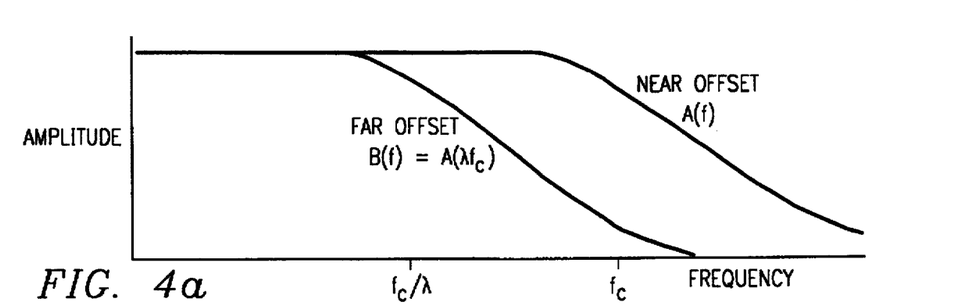
FIGS. 4a and 4b are frequency response curves illustrating the amplitude spectrum of near and far offset wavelets, and the frequency response of a filter function, respectively.

For clarity of explanation, the theory of operation of the preferred embodiment of the invention will now be described. In this regard, and in connection with the present invention, it has been discovered that offset-dependent wavelet distortion can be expressed approximately in terms of systematic changes in Butterworth filter parameters. Consider the time-domain wavelet representation b(t) to be a distorted version of a wavelet a(t), where the distortion arises from a stretching of the wavelet in the time-domain. As such, in this example, a(t) may represent a small offset seismic wavelet while b(t) represents a wavelet corresponding to the same event as a(t), but at larger offset and after NMO correction. As is known in the art, the NMO correction projects each trace into the zero-offset time domain. In this example:

$$b(t) = a(t/\lambda)$$

where $\lambda$ is the stretch factor. In the frequency domain, the wavelet a(t) will thus have an amplitude spectrum A(f) that can be expressed approximately as:

$$A(f) = \frac{1}{\sqrt{1 + (f/f_c)^\alpha}}$$

where $f_c$ is the high-frequency cutoff frequency, and where $\alpha$ is the high-frequency rolloff of the wavelet a(t). FIG. 4a illustrates the amplitude spectrum A(f) for this near-offset trace. In this embodiment of the invention, where the wavelet a(t) corresponds to a seismic trace wavelet based upon detected acoustic vibratory energy, low-frequency cut-off behavior can be ignored, as NMO stretch does not substantially affect the low-frequency side of the amplitude spectrum. Given the above, one may express the amplitude spectrum B(f) of the stretched wavelet b(t) as follows:

$$B(f) = \lambda A(\lambda f) = \frac{\lambda}{\sqrt{1 + (\lambda f/f_c)^\alpha}}$$

FIG. 4a also shows the amplitude spectrum B(f) for this stretched wavelet. One may therefore derive a "stretch" filter F(f), as the ratio of the amplitude spectrum A(f) of the undistorted wavelet a(t), to the amplitude spectrum B(f) of the distorted wavelet b(t), as follows:

$$F(f) = \frac{A(f)}{\lambda A(\lambda f)} = \frac{\sqrt{1 + (\lambda f/f_c)^\alpha}}{\lambda \sqrt{1 + (f/f_c)^\alpha}}$$

Figure 4B:
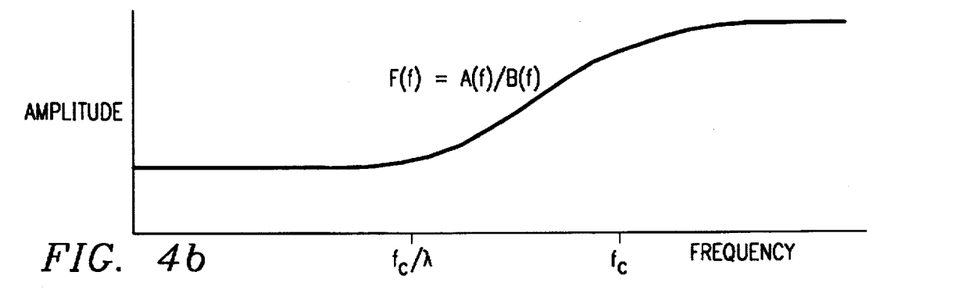

This stretch filter F(f) is an all-pass filter that amplifies high frequency components; as such, this amplification facilitates correction of NMO wavelet stretch distortion, as will now be explained. FIG. 4b illustrates the frequency response of this filter F(f) as substantially flat until the frequency $f_c/\lambda$, with increasing amplitude until frequency $f_c$ at which the response characteristic again flattens.

Based on the foregoing, it is evident that the stretch correction filter F(f) has three unknowns, namely the stretch factor $\lambda$, the cutoff frequency $f_c$, and the high frequency rolloff $\alpha$. One may simultaneously solve for these three unknowns by a multi-parameter search and optimization routine. However, it has been discovered that, in the case of seismic survey analysis, one may adequately estimate the cutoff frequency $f_c$ and the rolloff factor $\alpha$ based upon a near-offset trace of the CDP gather.

Determination of the stretch factor $\lambda$ is made, according to the preferred embodiment of the invention, by way of a semblance analysis. In the typical case where the subsurface is substantially horizontally layered, the stretch factor may be set to be proportional to the NMO time $\Delta t(x)$ for a given wavelet event at an offset of x as follows:

$$\lambda = \kappa \Delta t(x)$$

where $\kappa$ is a stretch coefficient. This proportional relationship may be readily applied in a semblance analysis to estimate a stretch coefficient $\kappa$ profile, in a similar fashion as velocity spectrum analysis. In particular, semblance analysis may be made by iterative application of the stretch coefficient $\kappa$ for events along an uncorrected trace, with analysis gates based upon the relationship of b(t) to a(t) noted above, resulting in a semblance value versus NMO time $\Delta t(x)$ and versus stretch coefficient $\kappa$. Alternatively, one may apply stretch filtering for each of many trial stretch coefficients $\kappa$ separately.

In any case, according to the preferred embodiment of the invention, a stretch filter F(f) in the frequency domain, or preferably a stretch filter F(t) in the time domain, is provided that may be applied in a time-varying fashion to individual traces in a CDP gather after normal moveout, to correct for the NMO stretch distortion effect. Application of the NMO stretch filter F is preferably followed by a high-frequency filter that is based on an event weighting approach, to attenuate any high frequency noise that may have been amplified by the stretch filter.

Given this background, the preferred embodiment of the invention will now be described in detail.

Figure 5:
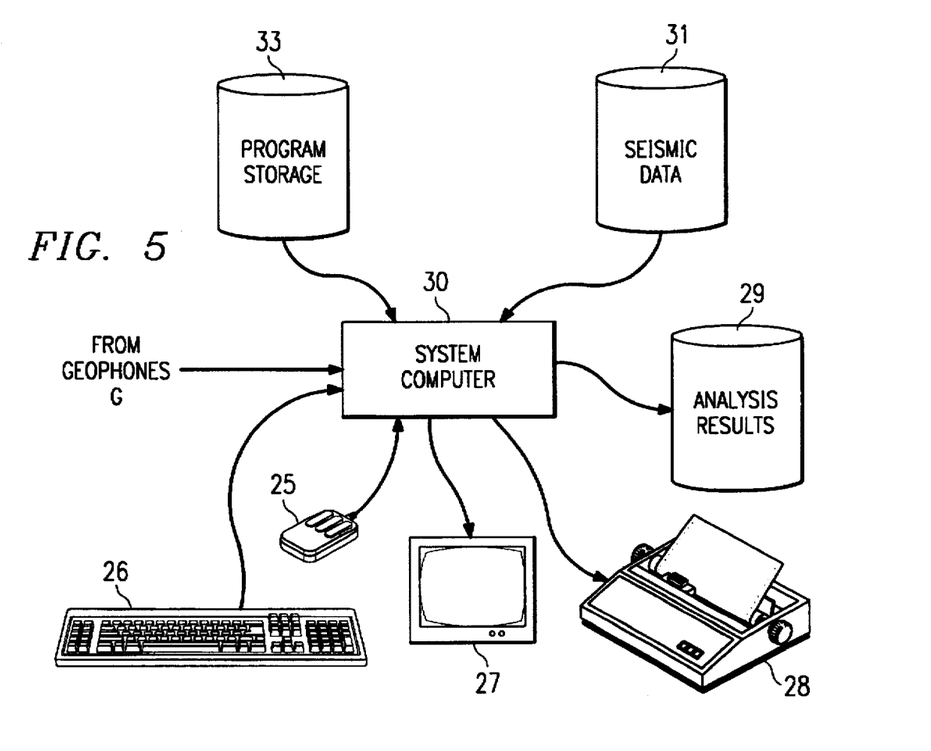
FIG. 5 is an electrical diagram, in block form, of a computer system programmed according to the preferred embodiment of the invention.

Referring now to FIG. 5, a computer system into which the preferred embodiment of the invention may be implemented, will be described. This system includes system computer 30, which may be implemented as any conventional personal computer or workstation, preferably a UNIX-based workstation such as a SPARCstation available from Sun Microsystems, Inc., implemented either in standalone fashion, or as part of a network arrangement. System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from geophones or marine seismic detectors, as the case may be for land-based or marine surveys, respectively, are stored on disk storage device 31. System computer 30 may thus retrieve the appropriate data from disk storage device 31 to perform the program instructions that correspond to the method of analysis described hereinbelow. For operation on system computer 30, the program instructions are written in the form of a computer program (e.g., in FORTRAN, C++, or in any other suitable language) stored in computer-readable memory, such as program disk storage device 33 of FIG. 5; of course, the memory medium storing the computer program may be of any conventional type used for the storage of computer programs, including hard disk drives, floppy disks, CD-ROM disks, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 may either be located at a data center remote from the survey region, or alternatively may be located on site at the seismic survey to provide real-time analysis of the seismic survey as it is being taken.

In the example of a land-based survey, as shown in FIG. 1, system computer 30 is in communication with the detectors (either directly or via a recording unit, not shown), to receive signals indicative of the reflected seismic energy received thereat in the survey. These signals, after conventional formatting and other initial processing, are stored by system computer as digital data in disk storage 31 for subsequent retrieval and processing in the manner described hereinbelow. While FIG. 5 illustrates disk storage 31 as directly connected to system computer 30, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 6:
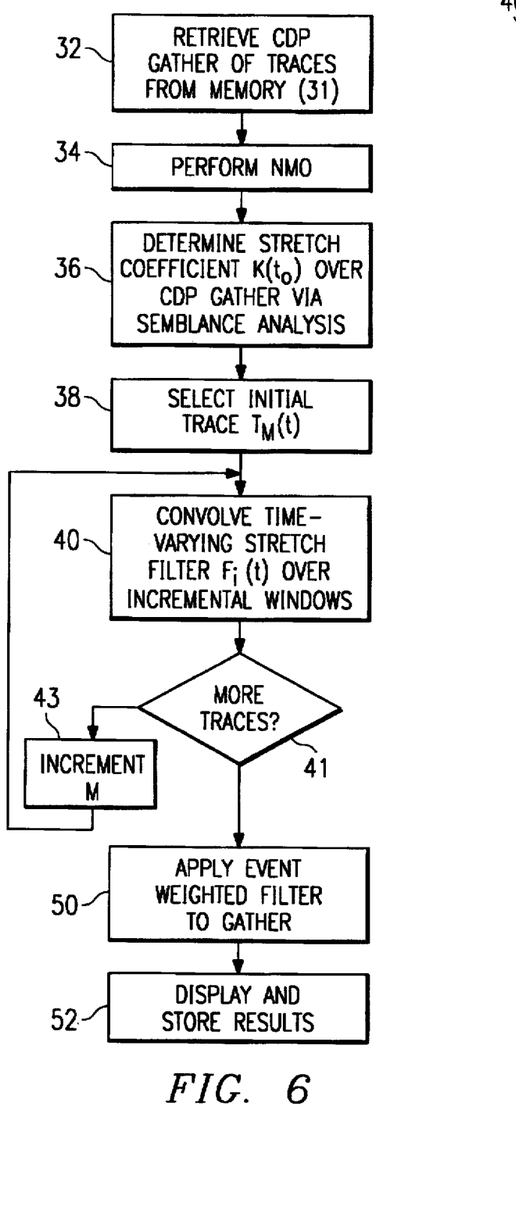
FIG. 6 is a flow chart illustrating a method of correcting for NMO stretch according to the preferred embodiment of the invention.

Referring now to FIG. 6, the method of seismic survey analysis according to the preferred embodiment of the invention will now be described in detail, relative to a single common depth point (CDP) gather. The method of FIG. 6 will, of course, be repeated for each of the CDP gathers in the overall seismic survey. As is known in the art, a CDP gather is a group of traces having common depth points (CDP), and thus indications of reflected energy from the same depth points but at varying offsets. The method begins, in process 32, by system computer 30 retrieving the seismic trace data corresponding to the desired CDP gather from storage 31. In process 34, system computer 30 performs a conventional normal move-out correction, commonly referred to as NMO, upon the retrieved gather. As discussed above, NMO is conventionally performed by the determination of a stacking velocity $V_r$, and applying the stacking velocity to each trace that is at a particular offset, through use of the Dix hyperbolae. The stacking velocities may vary with time, to account for variations in the acoustic velocities over different subsurface strata at the various depths. The performance of NMO correction in process 34 projects each of the traces T(t) into the zero-offset time domain, as is well known.

As described above, the conventional NMO correction of process 34 results in NMO stretch distortion in the corrected wavelets, particularly at large offset. According to this embodiment of the invention, therefore, these distortion effects are corrected by way of the application of an NMO stretch correction filter. The generation of the proper NMO stretch correction filter begins, in this example, with the determination of a stretch coefficient $\kappa$ profile by system computer 30 in process 36, as will now be described.

In process 36, system computer 30 performs a semblance analysis of stretch coefficient $\kappa$ over the NMO-corrected CDP gather. This semblance analysis is performed by iteratively applying values of stretch coefficient $\kappa$ over each wavelet event in each trace. In each iteration for a wavelet event $b_j(t)$ in a trace at a given offset distance x, a trial stretch factor $\lambda_j$ is derived for the trial stretch coefficient $\kappa_j$ according to the equation:

$$\lambda_j = \kappa_j \Delta t(x)$$

where, as above, $\Delta t(x)$ is the NMO correction time at the offset distance x. A semblance value is then derived for the wavelet event $b_j(t)$, for the trial stretch factor $\lambda_j$, by transforming the wavelet event time representation $b_j(t)$ by the equation:

$$b_j(t) = a(t/\lambda_j)$$

and then comparing the transformed wavelet event to the zero-offset wavelet event a(t) to derive a semblance factor (between 0 and 1) for the iteration of stretch coefficient $\kappa_j$. After the semblance analysis, system computer 30 then generates a stretch coefficient profile of the values of stretch coefficient $\kappa$ as a function of zero-offset time for each trace. Following the derivation of the stretch coefficient $\kappa$ profile, correction of the traces in the CDP gather may now be performed. Process 38 initiates this correction by the selection of the first trace $T_m(t)$ for correction, and the retrieval of its NMO-corrected trace data and stretch coefficient $\kappa$ profile from memory by system computer 30.

Following process 38, system computer 30 convolves trace $T_m(t)$ with a time-varying stretch filter function $F_i(t)$ in process 40 to perform the NMO stretch correction function.

Figure 7:
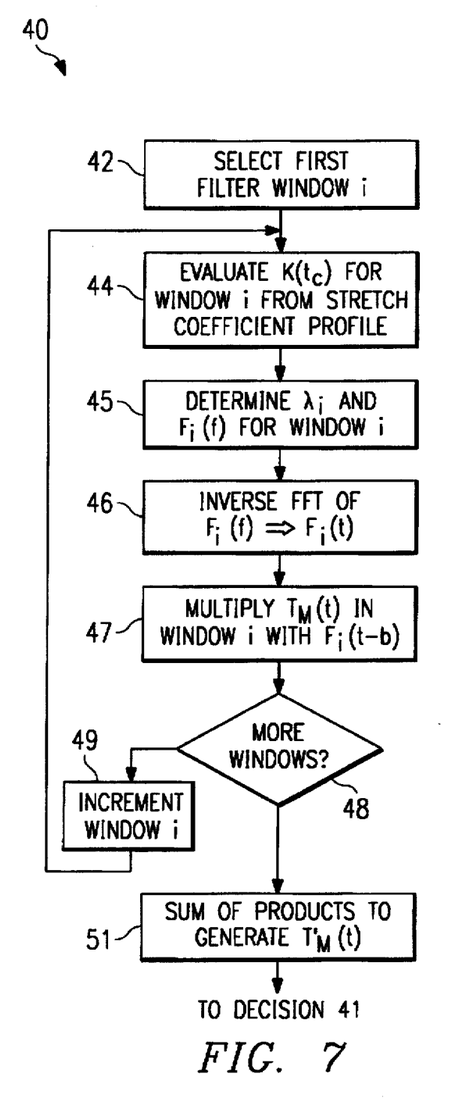
FIG. 7 is a detailed flow chart of the convolution process according to the preferred embodiment of the invention.

Attention is now directed to FIG. 7, in which the steps of process 40 will now be described in detail, beginning with process 42 in which a first time-domain filter window $W_i$ of trace $T_m(t)$ is selected by system computer 30. This time window $W_i$ is a portion of trace $T_m(t)$ that is of a selected length, for example on the order of 50 msec (i.e., having on the order of twenty-five samples of the detector output therein), and is to be convolved with a filter function element. Process 44 is then performed, by way of which system computer 30 interrogates the stretch coefficient profile to determine a stretch coefficient value $\kappa_i$ for the window $W_i$; for example, the stretch coefficient value $\kappa_i$ may be that which has the maximum semblance value, as identified in process 36, at the center time point in the window $W_i$. Process 45 then determines a stretch factor value $\lambda_i$ that is based upon the stretch coefficient value $\kappa_i$, and the offset distance x for the selected trace $T_m(t)$, according to the equation:

$$\lambda_j = \kappa_j \Delta t(x)$$

This stretch factor $\lambda_i$ is then used in process to generate the frequency-domain NMO stretch filter function element $F_i(f)$ from the equation $$F_i(f) = \frac{A(f)}{\lambda A(\lambda f)} = \frac{\sqrt{1 + (\lambda f/f_c)^\alpha}}{\lambda \sqrt{1 + (f/f_c)^\alpha}}$$

In this embodiment of the invention, the cutoff frequency $f_c$ and the high-frequency rolloff $\alpha$ may be accurately estimated from the NMO-corrected CDP gather; alternatively, a multiparameter analysis and optimization may be performed to provide values for these parameters. According to the preferred embodiment of the invention, the NMO stretch filter is applied in the time-domain, to take advantage of the relatively short duration necessary for the time-domain NMO stretch correction filter (considering that the filter is a broad-band filter, as evident from FIG. 4b). Process 46 is therefore performed by system computer 30 to derive a time-domain NMO stretch filter function element $F_i(t)$ for time window $W_i$ by the inverse Fourier transform (performed by an inverse discrete Fourier transform, or inverse Fast Fourier transform FFT) of the frequency domain function element $F_i(f)$ corresponding to window $W_i$.

The time-domain NMO stretch filter element $F_i(t)$ is then multiplied with the portion of the trace $T_m(t)$ in the selected window $W_i$, in process 47, to provide a step in the time-domain convolution of the time-varying NMO stretch filter with the trace $T_m(t)$. This multiplication is performed, of course, with the reversal in time of the stretch filter element $F_i(t)$ over the time window; for example, if the time window extends along the time axis from a to b, the multiplication of process 47 will be as follows:

$$T_m(t)|_{t=a}^{\to b} \cdot F_i(b-t)$$

Decision 48 is then performed to determine if additional time windows i remain in trace $T_m(t)$ for analysis.

Figure 8:
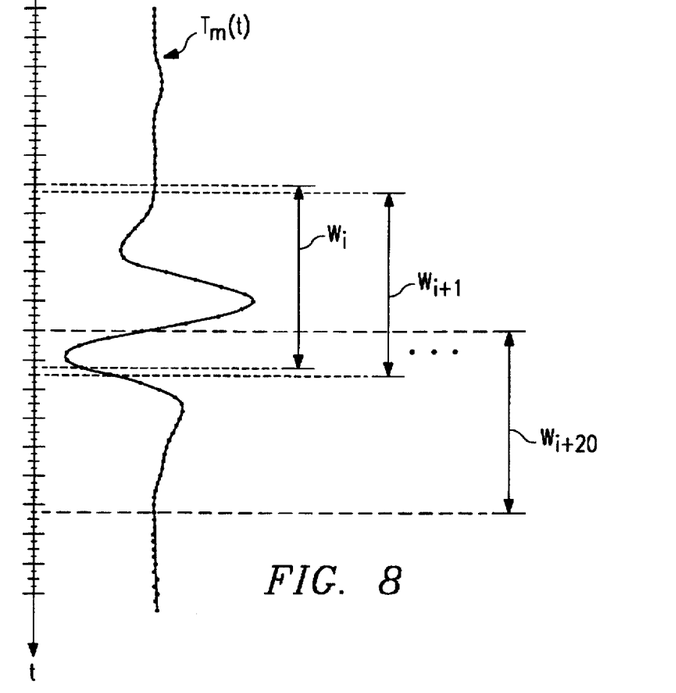
FIG. 8 is a timing chart illustrating the relative positions of convolution intervals along an exemplary trace.

If additional traces remain, index i is incremented in process 49, and the evaluation of the stretch coefficient $\kappa$ and its use to perform the elemental multiplication of the convolution is repeated. The incrementing of the index i to select a new time window is preferably performed by moving the time window by a single sample interval. This incrementing will thus move the time window by a shorter duration (e.g., 2 msec) than the length of the window itself (e.g., 50 msec). This movement of the time windows is illustrated in FIG. 8 in which a portion of trace $T_m(t)$ is shown, having discrete sampled amplitude values therein. Window $W_i$ is illustrated as corresponding to a portion of trace $T_m(t)$. The next adjacent window $W_{i+1}$, as illustrated in FIG. 8, substantially overlaps window $W_i$ as it has incremented by single sample interval, which is much shorter than the length of window $W_i$. Window $W_{i+20}$ is also illustrated in FIG. 8 to show that many windows W will overlap one another. As described in detail hereinabove, different time-domain filter elements $F_i(t)$, $F_{i+1}(t)$, $F_{i+20}(t)$, are associated with windows $W_i(t)$, $W_{i+1}(t)$, $W_{i+20}(t)$, respectively, as they are based on different values of stretch factor $\lambda$ as produced from the stretch coefficient $\kappa$ profile for trace $T_m(t)$.

Upon completion of the multiplication of the time domain filter elements $F_i(t)$ with all of the corresponding windows W of trace $T_m(t)$, the results of the multiplication operations are summed by system computer 30, in process 51, to derive a corrected trace $T_m'(t)$ that is the convolution of the NMO-corrected trace $T_m(t)$ and the time-varying filter function F(t) applied thereto. Referring back to FIG. 6, control then passes to decision 41, which determines if additional traces $T_m(t)$ remain in the CDP gather to be corrected for NMO stretch. If so, the index m is incremented (process 43), and process 40 is repeated to perform the convolution of the trace with its time-varying NMO stretch filter in the manner described hereinabove.

Figure 9A:
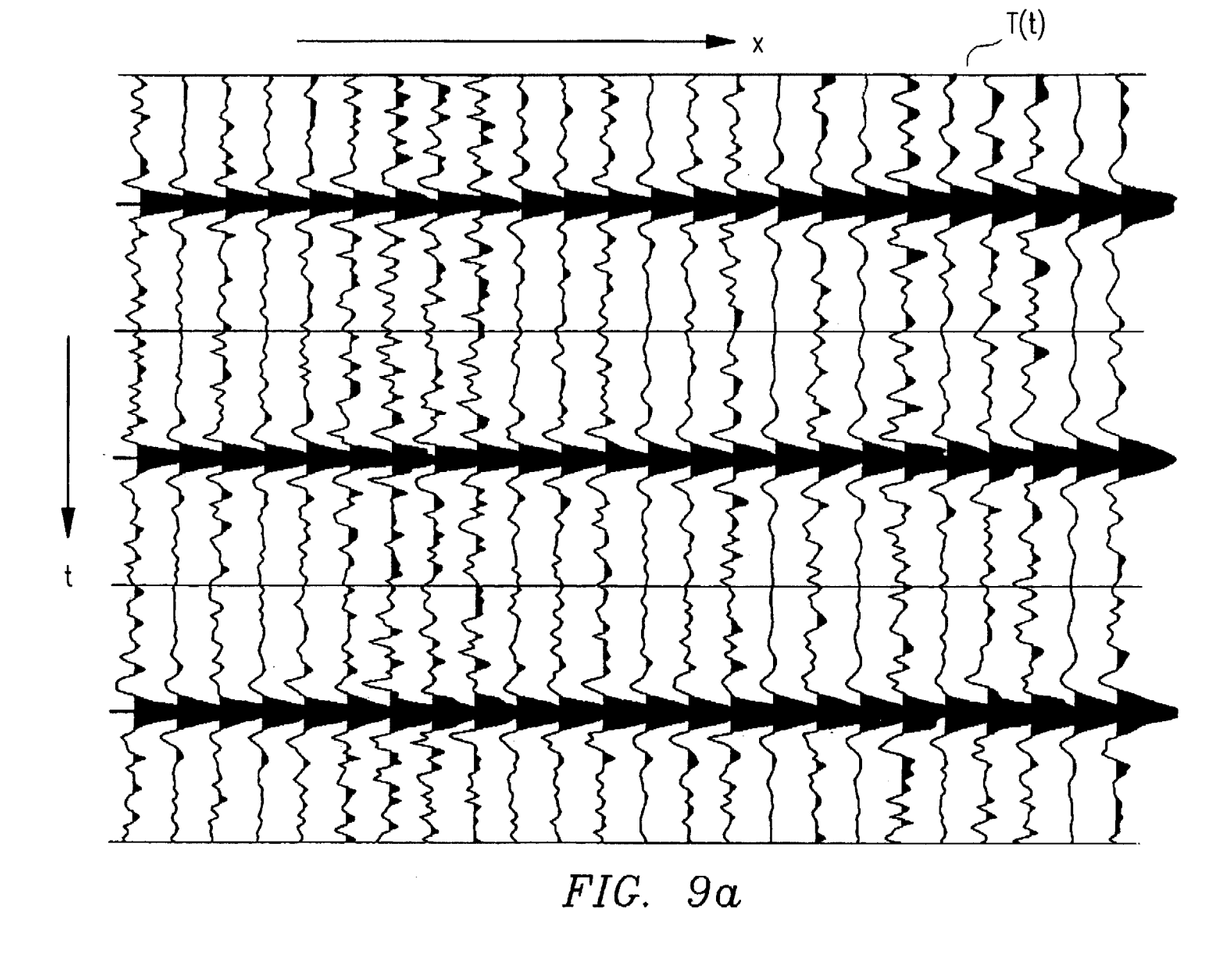
FIGS. 9a through 9c are seismic survey plots illustrating the effect of NMO stretch correction and signal-to-noise enhancement according to the preferred embodiment of the invention.
Figure 9B:
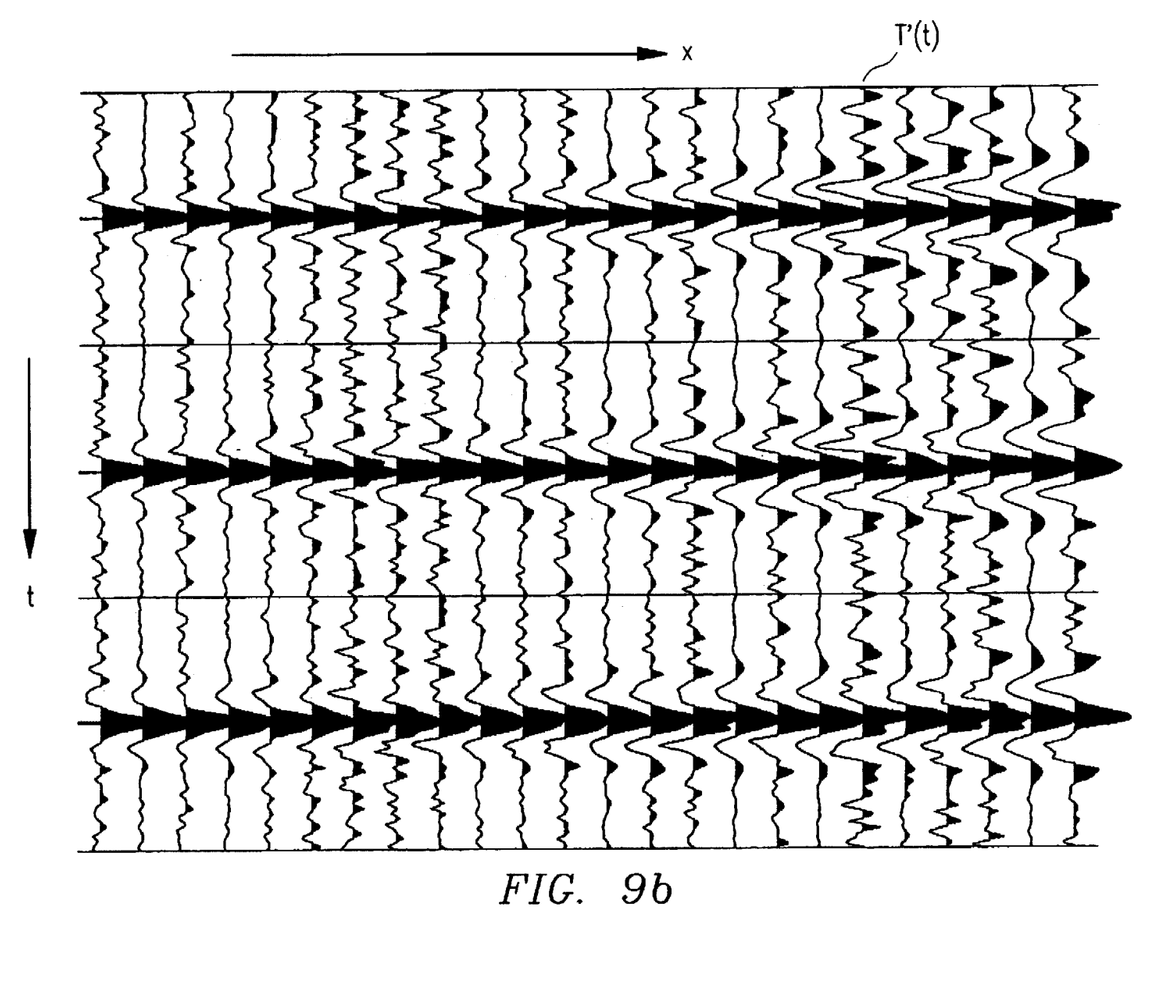

Referring now to FIGS. 9a and 9b, an example of the effect of the NMO stretch filtering process described hereinabove will now be described. FIG. 9a illustrates a series of traces T(t), of increasing offset distance x from left to right, after NMO correction (process 34) and prior to NMO stretch correction (process 40). As is evident from FIG. 9a, the width of the event wavelets increases with increasing offset, as is typical for NMO stretch resulting from conventional NMO correction according to the Dix hyperbolae. FIG. 9b illustrates the corresponding traces T'(t) after NMO stretch filtering performed for each trace in process 40 described hereinabove. The width of the event wavelets for traces at larger offset distances is much reduced, as is evident from FIG. 9b. As such, the effect of process 40 for the CDP gather of FIGS. 9a and 9b is to remove the effect of NMO stretch, particularly for larger offsets.

As is evident from FIG. 9b, however, certain high frequency artifacts are introduced into the corrected traces T'(t), particularly evident between the event wavelets at larger offset distances x. These high frequency artifacts are due to the amplification of the high frequency components of the signals provided by the time-varying NMO stretch correction filter F(t), as shown in FIG. 4b. Of course, one may apply any sort of high frequency filter to the corrected traces T'(t) to remove the high frequency artifacts introduced by the NMO stretch correction filter. It has been observed, however, that in situations where large amounts of NMO stretch are corrected (i.e., greater than 20 percent stretch), a simple low-pass filter with a single clipping frequency is inadequate to provide suitable filtering of the high frequency effects. According to the preferred embodiment of the invention, a filter of the event weighting type is applied by system computer 30, in process 50 of FIG. 6, to correct for these artifacts, as will now be described.

Figure 10:
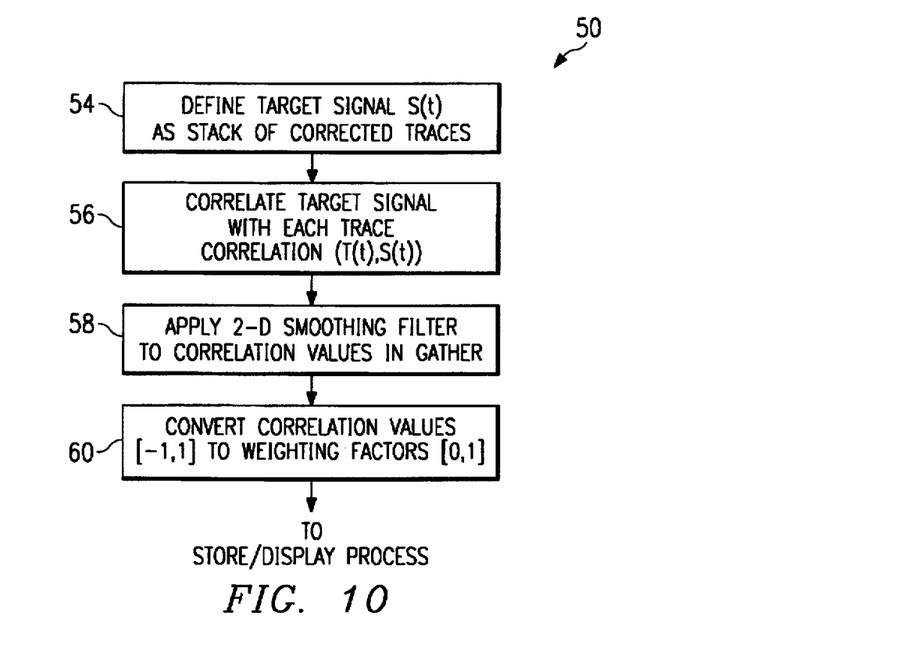
FIG. 10 is a detailed flow chart of the filtering process according to the preferred embodiment of the invention.

Event weighting filter process 50 begins with process 54, in which a target signal S(t) is generated, for the CDP gather, as the stack of the corrected traces T'(t) produced by process 40. While this stacking will include, in the target signal S(t), some contribution from the high frequency artifacts, the correction for NMO stretch provided by process 40 results in a relatively high signal-to-noise ratio in the target signal S(t) due to the improved coherence of the event wavelets after NMO stretch correction. Once the target signal S(t) has been produced for the CDP gather, process 56 performs a correlation of the target signal S(t) with each of the corrected traces T'(t) in the gather. This correlation of process 56 is performed as a function of time, to provide a correlation coefficient profile $C_j(t)$ for the jth trace T'(t), according to the following:

$C_j(t)=corr[T_j'(t),S(t)]$

As a result, each trace $T_j'(t)$ provides its own correlation coefficient profile $C_j(t)$, such that a two-dimensional correlation coefficient profile C(j, t) is generated to correspond to the CDP gather. Process 58 then performs a 2-dimensional smoothing, or low-pass filter, to the values of the two-dimensional correlation coefficient profile C(j, t). The event weighting filter is then completed by process 60, in which the two-dimensional correlation coefficient profile C(j, t) is converted to a two-dimensional profile weighting factor profile WF(j, t), where the values of WF vary within the range of [0, 1].

Figure 9C:
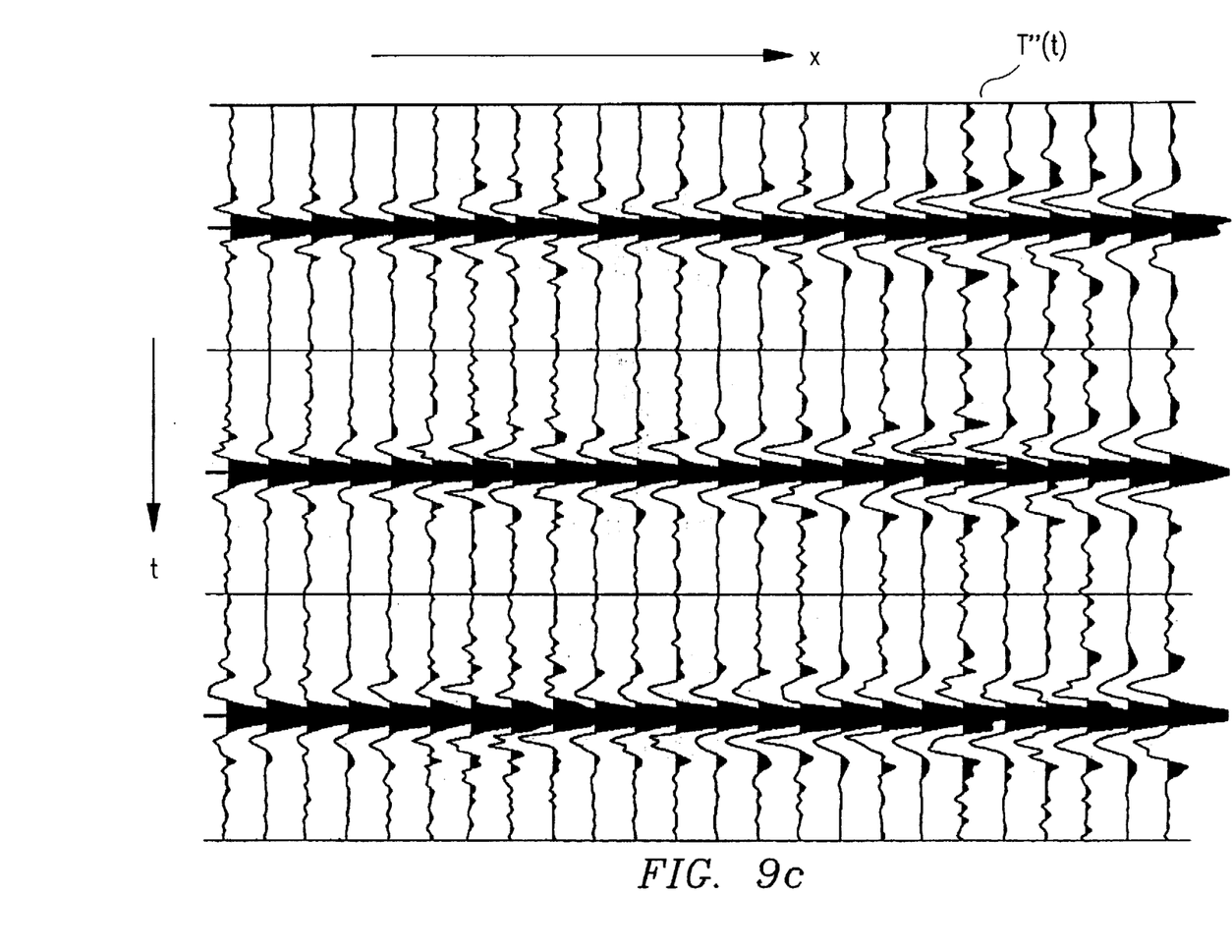

Control then passes to process 52, shown in FIG. 6, where the event-weighted filtered results of the process are displayed or otherwise output. As evident from FIG. 5, the results of the correction and filtering may be displayed on graphics display device 27 for viewing and interpretation by a human user, output on printer 28, or saved in disk storage 29 for use in additional data processing as conventional in the art for the interpretation of CDP gathered seismic survey data, including the stacking of the CDP gathered traces to further improve the signal-to-noise ratio. Such additional use and analysis is, of course, known in the art. FIG. 9c illustrates traces T"(t) in the CDP gather of FIGS. 9a and 9b, but after the application of the event-weighted filter thereto as described above. As is evident from a comparison of FIG. 9c to FIG. 9b, the event-weighted filter significantly reduces high-frequency noise from the gather, particularly at locations between detected events.

Of course, if additional CDP gathers are to also be processed to correct for NMO stretch, the process described hereinabove will be repeated for such gathers.

According to this embodiment of the invention, therefore, a practical and robust method and system for correcting seismic survey traces for the effects of NMO stretch is provided. The technique described hereinabove provides the important advantage of improving the signal-to-noise ratio of the CDP gather and stack information, through correction of NMO stretch that plagues large offset traces. This improvement is obtained in a way that does not require assumptions in the frequency response of the earth, but instead utilizes stretch factor values that may be based on a semblance analysis applied to the CDP gather. Only mild assumptions regarding the subsurface geometry and target wavelet are necessary, which results in more accurate correction considering that the validity of assumptions does not play a large role in the correction process; in addition, the NMO stretch correction may be applied to data from a variety of data acquisition techniques, because of its lack of dependence upon a significant number of assumptions. Indeed, the NMO stretch correction method provided by the present invention may be applied any type of prestack data after offset or aperture effect correction (such as NMO and migration), and may be combined with other tools, to correct for frequency-independent effects such as wave divergence, anisotropy and the like.

While the present invention has been described relative to its preferred embodiment, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to apply a correction to seismic survey signals corresponding to acoustic energy detected at a plurality of locations of the surface of the earth, such detected energy corresponding to acoustic energy from subsurface geological structures comprising the steps of:

retrieving, from computer memory, seismic trace data corresponding to a gather of seismic traces representative of acoustic energy detected at the plurality of surface locations and reflected from at least one common depth point, each trace in the gather having an offset distance;

applying a normal move-out correction to the retrieved seismic trace data;

for each of the traces in the gather, applying a time-varying stretch correction filter to the seismic trace data, where the time-varying filter is based upon a stretch factor for the trace which varies over zero-offset time, to generate stretch-corrected traces in the gather; and applying a low-pass filter to each of the stretch-corrected traces in the gather.

2. The method of claim 1, wherein the step of applying a low-pass filter comprises:

defining a target signal corresponding to the time-domain stack of the stretch-corrected traces in the gather;

correlating the target signal with each of the stretch-corrected traces in the gather; and developing a weighting factor profile over the gather from the results of the correlating step;

and further comprising:

displaying the stretch-corrected traces according to the weighting factor profile.

3. The method of claim 2, further comprising:

applying a two-dimensional smoothing factor to the weighting factor profile.

4. A method of operating a computer to apply a correction to seismic survey signals corresponding to acoustic energy detected at a plurality of locations of the surface of the earth, such detected energy corresponding to acoustic energy from subsurface geological structures comprising the steps of:

retrieving, from computer memory, seismic trace data corresponding to a gather of seismic traces representative of acoustic energy detected at the plurality of surface locations and reflected from at least one common depth point, each trace in the gather having an offset distance;

applying a normal move-out correction to the retrieved seismic trace data;

generating a stretch coefficient profile over the traces in the gather; and for each of the traces in the gather, applying a time-varying stretch correction filter to generate stretch-corrected traces in the gather by performing the steps of:

selecting a time window portion of a first trace;

determining a stretch factor for the selected time window, using a value of the stretch coefficient profile corresponding to the selected time window in the first trace;

determining a filter function element based on the determined stretch factor for the selected time window; and multiplying a time-domain representation of the filter function element with the selected time window of the first trace; and repeating the selecting, determining, and multiplying steps for each of a plurality of time windows for each of the traces in the gather.

5. The method of claim 4, further comprising:

upon completion of the repeated selecting, determining, and multiplying steps for the plurality of time windows of the first trace, adding the results of the multiplying steps for that trace.

6. The method of claim 5, wherein the step of determining the filter function element comprises:

deriving a frequency domain filter function element corresponding to the value of the stretch factor for the window; and performing an inverse Fourier transform of the frequency-domain filter function element to produce a time-domain filter function element.

7. The method of claim 6, wherein the step of generating a stretch coefficient profile over the traces in the gather comprises performing a semblance analysis of the traces in the gather with varying stretch coefficient values.

8. A computer system for correcting seismic survey signals corresponding to acoustic energy detected at a plurality of locations of the surface of the earth, such detected energy corresponding to acoustic energy from subsurface geological structures, and wherein the seismic survey signals represent a common depth point gather of a plurality of seismic traces having been corrected for normal move-out, comprising:

a computer memory for storing seismic trace data corresponding to the gather of seismic survey signals, said seismic trace data corresponding to a plurality of seismic traces after correction for normal move-out;

an output device, for presenting the corrected seismic survey signals to a human user;

a system computer, coupled to the computer memory and to the output device, programmed to perform, for each of the traces in the gather, a plurality of operations comprising:

applying a time-varying stretch correction filter to the seismic trace data, where the time-varying filter is based upon a stretch factor for the trace which varies over zero-offset time, to generate stretch-corrected traces in the gather; and applying a low-pass filter to each of the stretch-corrected traces in the gather.

9. The computer system of claim 8, wherein the computer is programmed to apply the low-pass filter through the steps of:

defining a target signal corresponding to the time-domain stack of the stretch-corrected traces in the gather;

correlating the target signal with each of the stretch-corrected traces in the gather; and developing a weighting factor profile over the gather from the results of the correlating;

and wherein the output device is a graphics display for presenting the stretch-corrected traces according to the weighting factor profile.

10. The computer system of claim 9, wherein the computer is also programmed to apply a two-dimensional smoothing factor to the weighting factor profile.

11. A computer system for correcting seismic survey signals corresponding to acoustic energy detected at a plurality of locations of the surface of the earth, such detected energy corresponding to acoustic energy from subsurface geological structures, and wherein the seismic survey signals represent a common depth point gather of a plurality of seismic traces having been corrected for normal move-out, comprising:

a computer memory for storing seismic trace data corresponding to the gather of seismic survey signals, said seismic trace data corresponding to a plurality of seismic traces after correction for normal move-out;

an output device, for presenting the corrected seismic survey signals to a human user; and a system computer, coupled to the computer memory and to the output device, programmed to apply a time-varying stretch correction filter to each of the traces in the gather by performing a plurality of operations comprising:

generating a stretch coefficient profile over the traces in the gather;

selecting a time window portion of a first trace;

determining a stretch factor for the selected time window, using a value of the stretch coefficient profile corresponding to the selected time window in the first trace;

determining a filter function element based on the determined stretch factor for the selected time window;

multiplying a time-domain representation of the filter function element with the selected time window of the first trace;

repeating the selecting, determining, and multiplying steps for each of a plurality of time windows for each of the traces in the gather; and upon completion of the repeated selecting, determining, and multiplying steps for the plurality of time windows of the first trace, adding the results of the multiplying steps for that trace.

12. The computer system of claim 11, wherein the computer is programmed to determine the filter function element by:

deriving a frequency domain filter function element corresponding to the value of the stretch factor for the window; and performing an inverse Fourier transform of the frequency-domain filter function element to produce the time-domain representation of the filter function element.

13. A computer-readable memory configured so that, when read and used by a computer, the computer is directed to apply a correction to seismic survey signals corresponding to acoustic energy detected at a plurality of locations of the surface of the earth, such detected energy corresponding to acoustic energy from subsurface geological structures, said computer directed by a plurality of operations comprising:

retrieving, from computer memory, seismic trace data corresponding to a gather of seismic traces representative of acoustic energy detected at the plurality of surface locations and reflected from at least one common depth point, each trace in the gather having an offset distance;

applying a normal move-out correction to the retrieved seismic trace data;

for each of the traces in the gather, applying a time-varying stretch correction filter to the seismic trace data, where the time-varying filter is based upon a stretch factor for the trace which varies over zero-offset time, to generate stretch-corrected traces in the gather;

defining a target signal corresponding to the time-domain stack of the stretch-corrected traces in the gather;

correlating the target signal with each of the stretch-corrected traces in the gather; and developing a weighting factor profile over the gather from the results of the correlating step; and displaying the stretch-corrected traces according to the weighting factor profile.

14. A computer-readable memory configured so that, when read and used by a computer, the computer is directed to apply a correction to seismic survey signals corresponding to acoustic energy detected at a plurality of locations of the surface of the earth, such detected energy corresponding to acoustic energy from subsurface geological structures, said computer directed by a plurality of operations comprising:

retrieving, from computer memory, seismic trace data corresponding to a gather of seismic traces representative of acoustic energy detected at the plurality of surface locations and reflected from at least one common depth point, each trace in the gather having an offset distance;

applying a normal move-out correction to the retrieved seismic trace data;

generating a stretch coefficient profile over the traces in the gather; and applying a time-varying stretch correction filter, for each of the traces in the gather by performing a plurality of operations comprising:

selecting a time window portion;

determining a stretch factor for the selected time window, using a value of the stretch coefficient profile corresponding to the selected time;

determining a filter function element based on the determined stretch factor for the selected time window;

multiplying a time-domain representation of the filter function element with the selected time window;

repeating the selecting, determining, and multiplying steps for each of a plurality of time windows; and upon completion of the selecting, determining, and multiplying steps for the plurality of time windows, adding the results of the multiplying steps.

15. The computer-readable memory of claim 14, wherein the step of determining the filter function element comprises:

deriving a frequency domain filter function element corresponding to the value of the stretch factor for the time window; and performing an inverse Fourier transform of the frequency-domain filter function element to produce the time-domain representation of the filter function element.

16. The computer-readable memory of claim 15, wherein the step of generating a stretch coefficient profile over the traces in the gather comprises performing a semblance analysis of the traces in the gather with varying stretch coefficient values.

17. The method of claim 4, further comprising:

applying a low-pass filter to each of the stretch-corrected traces in the gather.

18. The method of claim 17, wherein the step of applying a low-pass filter comprises:

defining a target signal corresponding to the time-domain stack of the stretch-corrected traces in the gather;

correlating the target signal with each of the stretch-corrected traces in the gather; and developing a weighting factor profile over the gather from the results of the correlating step;

and further comprising:

displaying the stretch-corrected traces according to the weighting factor profile.

19. The computer system of claim 11, wherein the system computer is also programmed to perform the operation of:

applying a low-pass filter to each of the stretch-corrected traces in the gather.

20. The computer system of claim 19, wherein the system computer is programmed to apply the low-pass filter by performing a plurality of operations comprising:

defining a target signal corresponding to the time-domain stack of the stretch-corrected traces in the gather;

correlating the target signal with each of the stretch-corrected traces in the gather; and developing a weighting factor profile over the gather from the results of the correlating;

and wherein the output device is a graphics display for presenting the stretch-corrected traces according to the weighting factor profile.

21. The computer-readable memory of claim 14, wherein the plurality of operations further comprises:

defining a target signal corresponding to the time-domain stack of the stretch-corrected traces in the gather;

correlating the target signal with each of the stretch-corrected traces in the gather;

developing a weighting factor profile over the gather from the results of the correlating step; and displaying the stretch-corrected traces according to the weighting factor profile.

* * * * *